No. 611,709. Patented Oct. 4, 1898.
I. H. SAPP.
BICYCLE SUPPORT.
(Application filed Apr. 11, 1898.)
(No Model.)
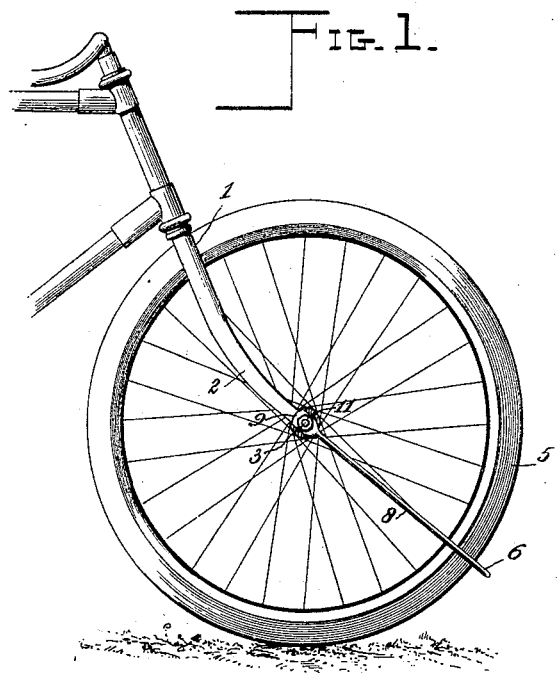
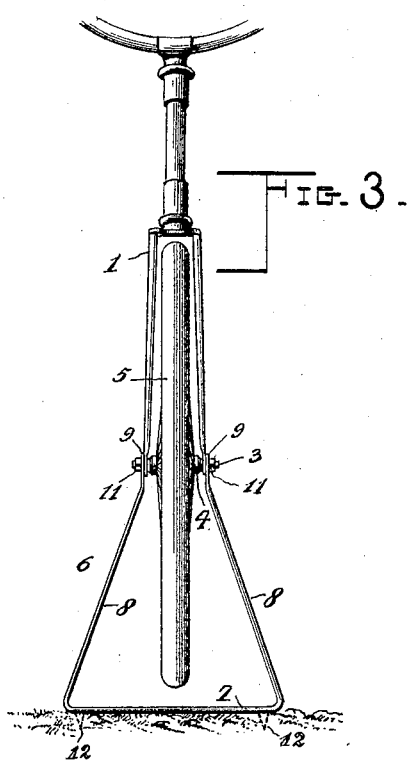
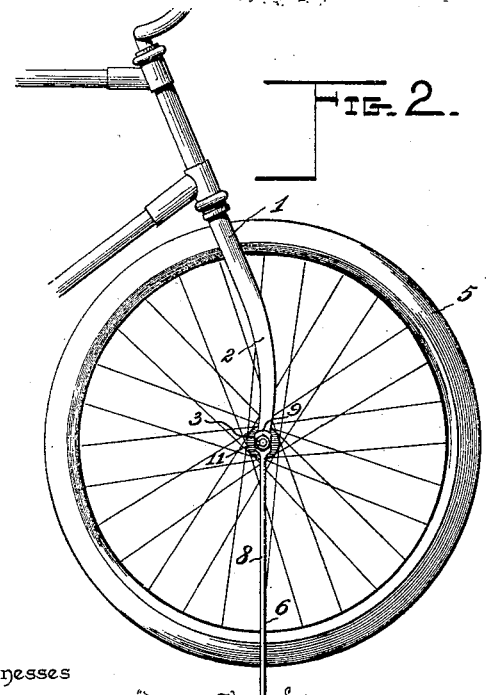
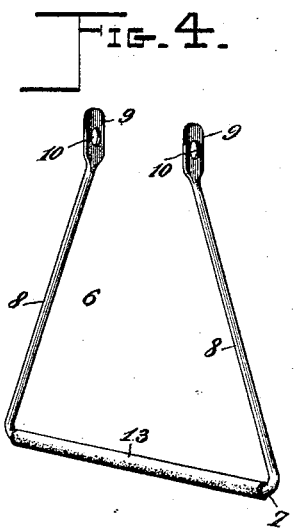
Witnesses Isaac H. Sapp, Inventor
By his Attorneys,

UNITED STATES PATENT OFFICE.

ISAAC HUDSON SAPP, OF PAPEETE, ISLAND OF TAHITI, ASSIGNOR OF ONE-HALF TO W. T. STUART, OF SAME PLACE.

BICYCLE-SUPPORT.

SPECIFICATION forming part of Letters Patent No. 611,709, dated October 4, 1898.

Application filed April 11, 1898. Serial No. 677,196. (No model.)

*To all whom it may concern:*

Be it known that I, ISAAC HUDSON SAPP, a citizen of the United States, residing at Papeete, in the Island of Tahiti, have invented a new and useful Bicycle-Support, of which the following is a specification.

My invention relates to improvements in stands or supports for safety-bicycles; and the object that I have in view is to provide a support which will be carried directly by the front steering-fork of the bicycle in a manner without interfering with the free adjustment of the fork or the running of the wheel journaled therein and which is adapted to be brought into position for use by a simple reversal of the position of the fork in its bearing in the steering-head of the bicycle.

A further object of the invention is to provide a simple and cheap construction which may be easily and quickly applied to any ordinary construction of safety-bicycle and which obviates the necessity for adjustment of the support or stand by hand on the bicycle when it is desired to bring the stand into the position for service to support the bicycle in an upright position without leaning it against a street-curb, a tree, or other object.

With these ends in view my invention consists in the combination, with a steering-fork of a bicycle and the non-rotatable axle of the front wheel, of a stand or support attached to said axle to normally occupy a position at an angle to or in alinement with the curved members of the steering-fork to be carried directly thereby without contact with the wheel and adapted to be brought into service by a reversal of the steering-fork in the head of the bicycle; and the invention further consists in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a side view of part of a bicycle, illustrating the improved stand or support in its relation to the steering-fork and front wheel when the machine is in use. Fig. 2 is a similar view, but showing the steering-fork reversed in its bearing in the steering-head to bring the improved stand or support into position for service. Fig. 3 is a front elevation of the parts in the position illustrated by Fig. 2. Fig. 4 is a detail perspective view of the stand or support detached from the steering-fork of a bicycle.

Like numerals of reference denote like and corresponding parts in each of the several figures of the drawings.

My improved support or stand is especially designed for use on bicycles of that class in which the front steering-fork 1 has its members curved longitudinally, as at 2, toward the axle 3, which receives the hub 4 of the front steering-wheel. It is well known to those skilled in the art that the steering-fork of the ordinary safety-bicycle is journaled in the steering-head to be turned therein a distance equivalent to a half-revolution, and when a curved steering-fork is thus turned in the steering-head of the machine-frame the extremities thereof will assume a substantially vertical position with relation to the street-surface or the ground-line. I utilize this adaptation of the steering-fork in the application of my improved stand or support to said fork. I have so arranged and combined the stand with relation to the fork that it will project in a substantially horizontally-inclined position beyond the periphery of the wheel 5 when the fork is adjusted to its normal position for service of the machine, thus disposing the support in a manner to entirely avoid interference with the proper rotation of the front wheel; but a reversal of the steering-fork in its head serves to adjust the support or stand to a substantially vertical position and bring the foot or base of said stand into contact with the ground, whereby the stand is adapted to sustain the front end of the bicycle in a raised position when its front wheel 5 is free from the ground and also to prevent the machine from falling sidewise.

My support is indicated in its entirety by the numeral 6 in the drawings, and it consists of a foot 7 and the arms 8. In the practical construction of the stand I employ a single length of tubing, a bar or a rod which is bent at two points to form the foot 7 and the arms 8. The arms are inclined inwardly toward each other, and the extremities thereof are flattened or otherwise constructed to provide the parallel ears 9, which are perforated transversely, as at 10, and are spaced apart a distance equivalent to that of the extremities of the fork members 1. It will be seen that the foot 7 of the support is much broader than the distance between the parallel ears 9 thereof, and when the support is adjusted into position for service the broad foot 7 thereof serves to sustain the bicycle steadily in place and wholly overcomes any tendency to fall sidewise.

In applying my improved support to a bicycle the axle-nuts 11 are removed from the ends of the axle and the support is adjusted to have the ears 9 thereof fit on the axle against the extremities of the fork members 1, after which the nuts 11 are screwed on the axle to clamp the extremities of the support firmly against the steering-fork 1. In applying the improved support to a fork it is necessary to exercise care in positioning the support on the axle and with relation to the fork previous to tightening up the clamping-nuts 11. The support should have its arms 8 arranged at a slight angle to the curved line of the fork members, substantially as represented by Fig. 1, and in this position of the support it will be made to assume a substantially vertical position when the steering-fork is reversed in the head of the bicycle-frame.

My improved support is clamped rigidly on and carried wholly by the axle of the front steering-wheel without in any way touching or interfering with the free rotation of the front wheel 5, journaled in said fork, and said support normally extends along the sides and in advance of said front steering-wheel. When it is desired to bring the support into service, the operator dismounts from the wheel, lifts the front end thereof slightly, and turns the steering-fork a half-revolution in its bearing in the machine-frame. This reversal of the steering form brings the support to a substantially vertical position, and when the operator lowers the machine the foot 7 of the support rests directly upon the ground or street and sustains the bicycle in a slightly-raised position against falling over sidewise.

It may be desirable under some circumstances to provide the foot 7 of the support with the teeth or prongs 12, (represented by dotted lines in Fig. 3 of the drawings;) but I do not limit myself to the employment of these prongs, because the foot of the support may be provided with a friction-surface 13, which may consist of a length of tubing or a strip of suitable material.

I may also construct the stand for application pivotally to the axle of the steering-wheel, so that it may swing loosely upon the axle and be raised or lowered by the operator, in which case a spring-catch or other detent should be provided to hold the stand in its raised position.

The stand may also be constructed with a spring on each side thereof, or the arms 8 of the stand may be made of elastic material to cause the arms to resume their original shape should they be bent in event of injury to the machine.

My improved stand possesses the following practical advantages: It holds the bicycle firmly in an upright position without the assistance of extraneous means for supporting the bicycle. It is always in position for use, easy of operation and adjustment, sustains the front wheel from contact with the ground, holds the machine steady when oiling or cleaning the same, presents a neat and attractive appearance, is out of the way of the wheel and the operator when not in use, prevents injury to the finished surfaces of the bicycle, and obviates the necessity for finding a support to lean the wheel against while the operator is dismounted therefrom.

It is evident that changes in the form and proportion of parts may be made by a skilled mechanic without departing from the spirit or sacrificing the advantages of the invention.

Having thus described the invention, what I claim is—

1. In a bicycle, the combination of a reversible steering-fork, a wheel mounted thereon, and a stand fixed to the fork in a position inclined forwardly to a vertical line dropped from the wheel-axle in the normal position of the fork, and said stand reversible with the fork to assume a substantially vertical position and raise the front wheel from contact with the ground, substantially as described.

2. In a bicycle, the combination of a reversible steering-fork, a wheel-axle, a stand fixed to the wheel-axle and reversible with the fork, and a wheel mounted on said axle; said stand arranged, in the normal position of the fork, to incline forwardly of a vertical line dropped from the wheel-axle and adapted, on reversal of the fork and its wheel, to lie in a substantially vertical position beneath said wheel-axle, substantially as described.

3. The combination with a curved steering-fork and a non-rotatable axle, of a triangular support having its arms rigidly clamped on the axle and against the steering-fork, said support arranged to embrace the steering-wheel and disposed at an angle to the length of the steering-fork, whereby the support is carried wholly by the axle and fork and is caused to assume a vertical position by giving the steering-fork a semiturn in its bearing in the bicycle-frame, substantially as described.

In testimony that I claim the foregoing as my own I have hereto affixed my signature in the presence of two witnesses.

ISAAC HUDSON SAPP.

Witnesses:
 W. T. STUART,
 D. A. STUART.